US008978702B2

(12) United States Patent
Enomura

(10) Patent No.: US 8,978,702 B2
(45) Date of Patent: Mar. 17, 2015

(54) FLUID PROCESSING APPARATUS AND PROCESSING METHOD

(75) Inventor: Masakazu Enomura, Izumi (JP)

(73) Assignee: M. Technique Co., Ltd., Osaka (JP)

( * ) Notice: Subject to any disclaimer, the term of this patent is extended or adjusted under 35 U.S.C. 154(b) by 231 days.

(21) Appl. No.: 13/578,846

(22) PCT Filed: Feb. 21, 2011

(86) PCT No.: PCT/JP2011/053723
§ 371 (c)(1),
(2), (4) Date: Aug. 14, 2012

(87) PCT Pub. No.: WO2011/105333
PCT Pub. Date: Sep. 1, 2011

(65) Prior Publication Data
US 2012/0312398 A1    Dec. 13, 2012

(30) Foreign Application Priority Data

Feb. 26, 2010   (JP) ................. 2010-042590

(51) Int. Cl.
*B01F 5/04*   (2006.01)
*B01F 7/00*   (2006.01)
(Continued)

(52) U.S. Cl.
CPC ........... *B01F 7/00775* (2013.01); *B01F 3/0807* (2013.01); *B01F 7/00791* (2013.01); *B01J 19/1887* (2013.01)
USPC ..................... 137/896; 137/315.01

(58) Field of Classification Search
USPC .................... 137/315.01, 602, 896
See application file for complete search history.

(56) References Cited

U.S. PATENT DOCUMENTS

| 4,400,236 | A  | * | 8/1983  | Hanamura et al. ............ 159/2.2 |
| 6,951,704 | B2 | * | 10/2005 | Tsuji et al. ............... 430/137.14 |
| 7,278,592 | B2 | * | 10/2007 | Enomura .................... 239/533.1 |

(Continued)

FOREIGN PATENT DOCUMENTS

| JP | 56-164034 U | 12/1981 |
| JP | 8-60578 A   | 3/1996  |

(Continued)

OTHER PUBLICATIONS

Jun-ichi Yoshida, "Microreactor: Synthesis Technology in New Age", CMC Publishing Co., Ltd., p. 3, 2003.

*Primary Examiner* — John K Fristoe, Jr.
*Assistant Examiner* — Reinaldo Sanchez-Medina
(74) *Attorney, Agent, or Firm* — Birch, Stewart, Kolasch & Birch, LLP

(57) ABSTRACT

A fluid processing apparatus for processing a material to be processed between processing surfaces of processing members capable of approaching to and separating from each other, so as to rotate relative to each other, introduces a first fluid between the processing surfaces, introduces a second fluid between the processing surfaces from another flow path independent of the first fluid, and mixes and stirs the first and second fluids between the processing surfaces to undergo treatment. A processing member is composed by assembling a plurality of divided components of the processing member. An opening and a flow path are formed in the space between the plurality of components. This eliminates the need to create all ring-shaped disks which are the processing member as one block, and also eliminates the need to substantially process the flow path leading to the opening, thereby making it possible to easily undergo decomposition and cleaning.

21 Claims, 7 Drawing Sheets

(51) Int. Cl.
  *B01F 3/08*     (2006.01)
  *B01J 19/18*    (2006.01)

(56) References Cited

U.S. PATENT DOCUMENTS

| | | | | |
|---|---|---|---|---|
| 8,609,035 | B2 * | 12/2013 | Enomura | 422/225 |
| 8,623,415 | B2 * | 1/2014 | Enomura | 424/489 |
| 8,636,974 | B2 * | 1/2014 | Enomura | 423/612 |
| 8,708,550 | B2 * | 4/2014 | Enomura | 366/263 |
| 2004/0032792 | A1 * | 2/2004 | Enomura | 366/263 |
| 2006/0286015 | A1 * | 12/2006 | Holl | 422/224 |
| 2010/0319785 | A1 | 12/2010 | Endmura | |

FOREIGN PATENT DOCUMENTS

| | | |
|---|---|---|
| JP | 2004-49957 A | 2/2004 |
| JP | 2006-341232 A | 12/2006 |
| WO | WO 2009/008394 A1 | 1/2009 |

\* cited by examiner (A)

(B)

(A)

(B)

(C)

(D)

(E)

(F)

FLUID PROCESSING APPARATUS AND PROCESSING METHOD

TECHNICAL FIELD

The present invention relates to a fluid processing apparatus wherein a material to be processed is processed between processing surfaces in processing members capable of approaching to and separating from each other, at least one of which rotates relative to the other.

BACKGROUND ART

A microreactor or a micromixer has been provided as a fluid processing apparatus using a fine flow path or a fine reaction container. There is possibility that the microscopic reaction field given by such an apparatus could exert a substantial influence on chemical reactions carried out in beakers and flasks so far (see Non-Patent Document 1).

However, in a microreactor generally provided, a separated solid or a gaseous material produced by a reaction clogs a flow path depending on the reaction; and thus, the apparatus causes many problems such as blocking of the flow path finally, requiring a large pump because of a large pressure loss, and difficulty in up-scaling.

A fluid processing apparatus and a processing method, with which processing such as mixing, reaction, and separation is effected between processing surfaces of processing members capable of approaching to and separating from each other, at least one of which rotates relative to the other as described in Patent Document 1 or Patent Document 2 filed by the applicant of the present invention, realized to form a minute reaction field easily; and in addition, the problems of the microreactor as mentioned above could be solved.

However, even in the fluid processing apparatus as described in Patent Document 1 or Patent Document 2, there were the cases that a flow path having an opening leading to between the processing surfaces in the processing member was difficult to be cleaned when a solid material clogs the flow path and that the flow path having an opening was not easy to be worked, whereby parts of the processing member became expensive. In addition, in an up-scaling study of the apparatus, it is necessary to make a large processing member; in this case, if an entirety of the processing member, which is a disk having a ring form, is made as one bulk by using a method represented by a sintering method involving a high temperature treatment, production cost thereof increases with increase of the disk diameter because a molding equipment or a sintering equipment with a large size becomes necessary, whereby sometimes parts of the processing member become expensive.

In addition, for example, when a first fluid and a second fluid are intended to be mixed between the processing surfaces with its mixing ratio of 1:1, the processing surface provided with an opening having a circular ring form is desirable; but a processing member having the processing surface provided with an opening having a circular ring form has been difficult to be worked and formed.

PRIOR ART

Patent Document

Patent Document 1: JP-A 2004-49957
Patent Document 2: WO 2009/008394

Non-Patent Document

Non-Patent Document 1: "Microreactor: Synthesis Technology in New Age", supervised by Junichi Yoshida, CMC Publishing Co., Ltd., P. 3, 2003

SUMMARY OF THE INVENTION

Problems to be Solved by the Invention

In view of the above-mentioned, the present invention intends to improve further the apparatus described in Patent document 1 or Patent Document 2; and thus, an object thereof is to provide a processing member and a processing apparatus, which are simpler in cleaning, easier in up-scaling, and less expensive than ever, by assembling a plurality of divided components of the processing member to form the processing member.

Means for Solving the Problems

To solve the problems mentioned above, a first embodiment of the present invention provides a fluid processing apparatus for processing a material to be processed between processing surfaces of processing members capable of approaching to and separating from each other, at least one of which rotates relative to the other, and the processing thereof is effected by introducing a fluid to be processed into between the processing surfaces, wherein the processing member comprises a plurality of components of the processing member obtained by dividing the processing member, and the processing member is formed by assembling a plurality of these divided components of the processing member.

A second embodiment of the present invention is to provide the fluid processing apparatus according to the first embodiment; wherein at least two fluids to be processed are used, and a second fluid to be processed is introduced into between the processing surfaces from a separate flow path having an opening to a space between the processing surfaces, the said flow path being independent of a flow path through which a first fluid to be processed is introduced, whereby the first and second fluids to be processed are mixed and stirred between the processing surfaces, wherein a space between a plurality of the components of the processing member is made to be part of the flow path having the opening leading to the space between the processing surfaces.

A third embodiment of the present invention is to provide the fluid processing apparatus according to the first or the second claim, wherein a plurality of the divided components of the processing member to constitute the processing member is made of different materials for each component of the processing member.

A fourth embodiment of the present invention is to provide the fluid processing apparatus according to any one of the first to third embodiments, wherein the processing surfaces of the processing member formed by assembling a plurality of the divided components of the processing member are mirror-processed simultaneously under the state of the components being assembled.

A fifth embodiment of the present invention is to provide the fluid processing apparatus according to any one of the first to fourth embodiments, wherein the flow path having the opening with a circular ring form leading to the space between the processing surfaces is formed by assembling a plurality of the divided components of the processing member.

A sixth embodiment of the present invention is to provide the fluid processing apparatus according to any one of the first to fifth embodiments, wherein the processing surfaces formed by assembling a plurality of the divided components of the processing member comprise different components of the processing member, and the processing surfaces are composed such that the processing surfaces comprising different components of the processing member may not be formed in the same plain.

A seventh embodiment of the present invention is to provide the fluid processing apparatus according to any one of the first to sixth embodiments, wherein the processing apparatus comprises:

a fluid pressure imparting mechanism for imparting a pressure to the fluid to be processed, at least two processing members comprising a first processing member and a second processing member capable of approaching to and separating from the first processing member, a first holder to hold the first processing member and a second holder to hold the second processing member, and a rotation drive mechanism for rotating the first and second processing members relative to each other, wherein each of the processing members is provided with at least two processing surfaces of a first processing surface and a second processing surface disposed in a position they are faced with each other, each of the processing surfaces constitutes part of a flow path through which the fluid to be processed is passed, of the first and second processing members, at least the second processing member is provided with a pressure-receiving surface, and at least part of the pressure-receiving surface is comprised of the second processing surface, the pressure-receiving surface receives pressure applied to the fluid to be processed by the fluid pressure imparting mechanism thereby generating a force to move in the direction of separating the second processing surface from the first processing surface, and the fluid to be processed under the pressure is passed between the first and second processing surfaces being capable of approaching to and separating from each other and rotating relative to each other, whereby the fluid to be processed forms a thin film fluid.

Advantages

According to the present invention, a flow path and an opening arranged in a processing member can be cleaned more easily than before; and in addition, a fluid processing apparatus can be provided more cheaply than before.

BRIEF DESCRIPTION OF DRAWINGS

Each of FIG. 5(A) to FIG. 5(G) is a sectional view of an important part of the second processing member of the fluid processing apparatus according to still other embodiment of the present invention.

Each of FIG. 6(A) to FIG. 6(C) is a sectional view of an important part of the second processing member of the fluid processing apparatus according to still other embodiment of the present invention.

BEST MODE FOR CARRYING OUT THE INVENTION

Hereinafter, preferable embodiments of the present invention will be described with reference to the drawings.

Figure 1:
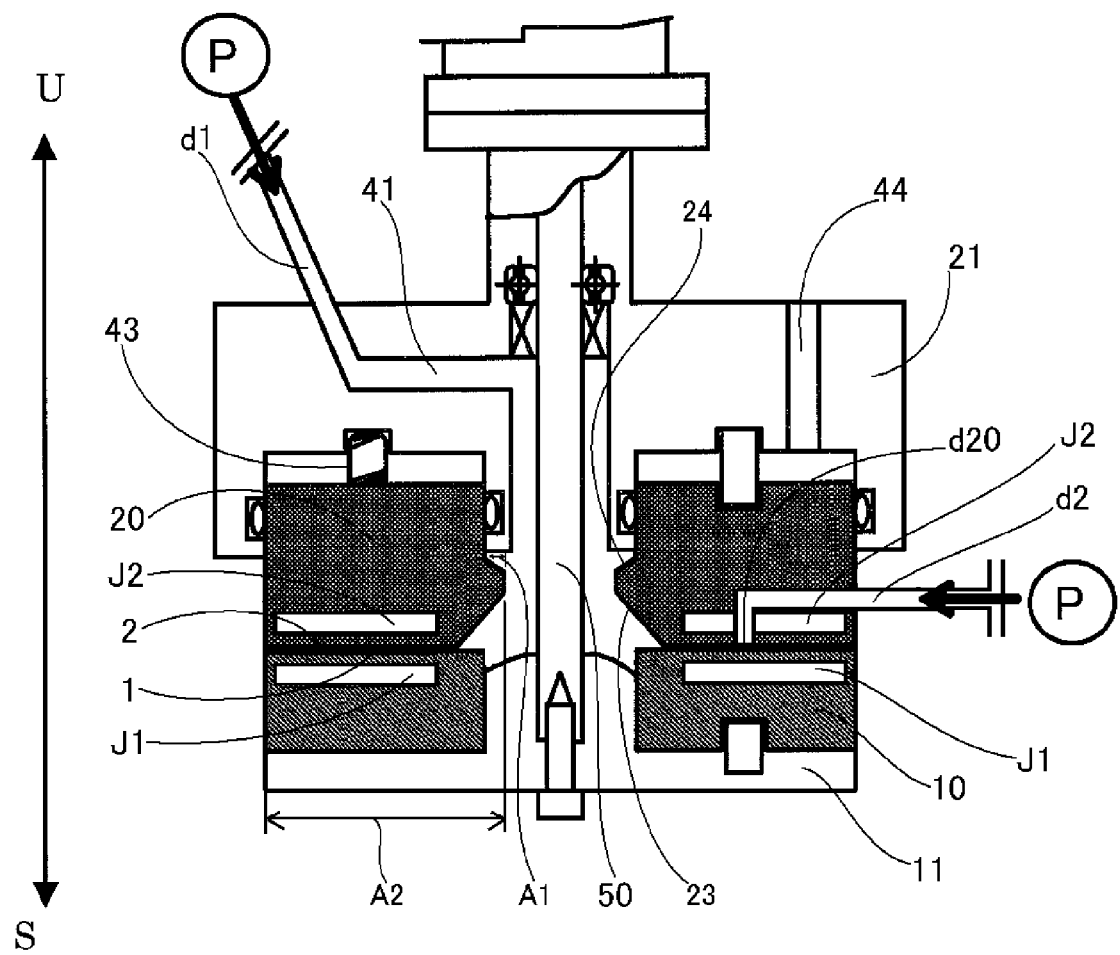
FIG. 1 is a schematic sectional view showing the fluid processing apparatus according to an embodiment of the present invention.
Figure 2:
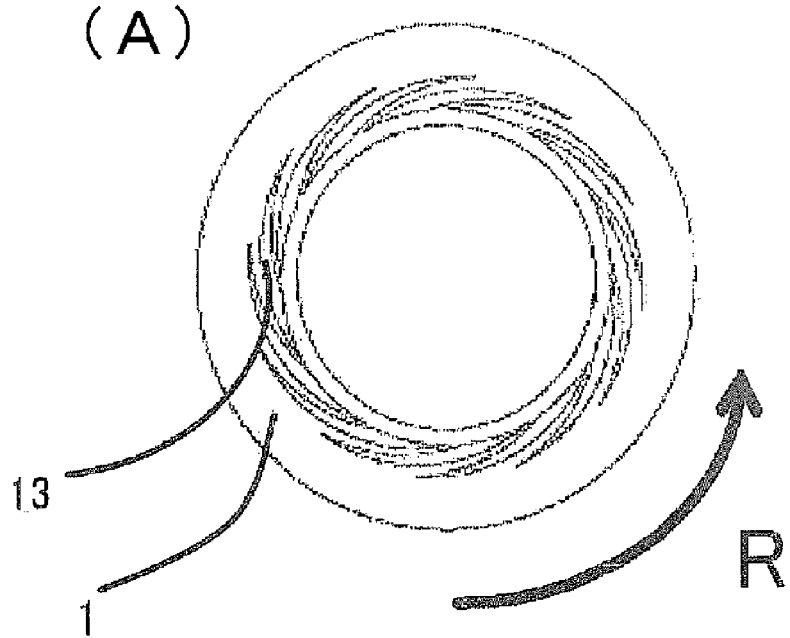
FIG. 2(A) is a schematic plane view of the first processing surface in the fluid processing apparatus shown in FIG. 1.
FIG. 2(B) is an enlarged view showing an important part of the processing surface in the apparatus.
Figure 2:
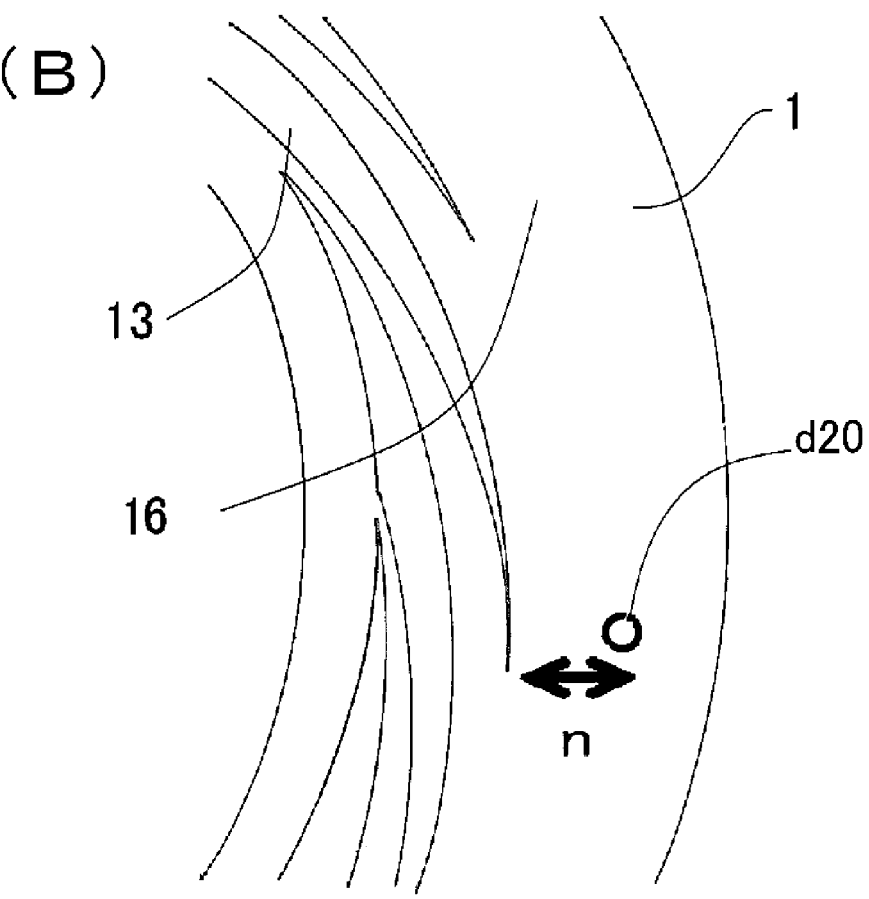
Figure 3:
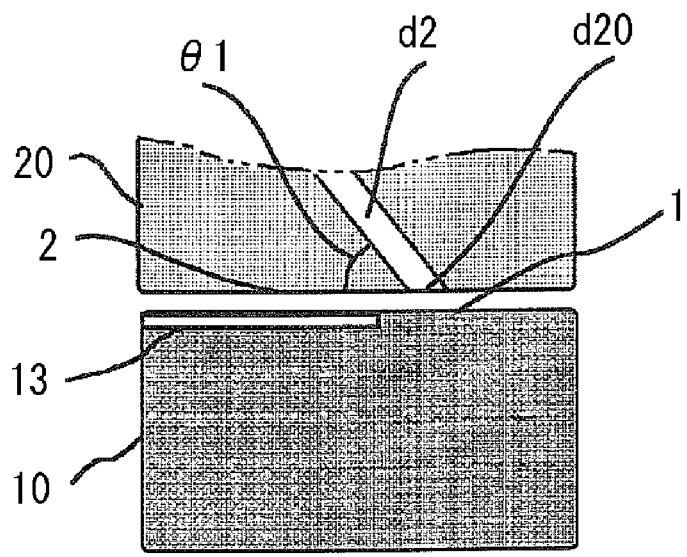
FIG. 3(A) is a sectional view of the second introduction path of the apparatus.
FIG. 3(B) is an enlarged view showing an important part of the processing surface for explaining the second introduction path.
Figure 3:
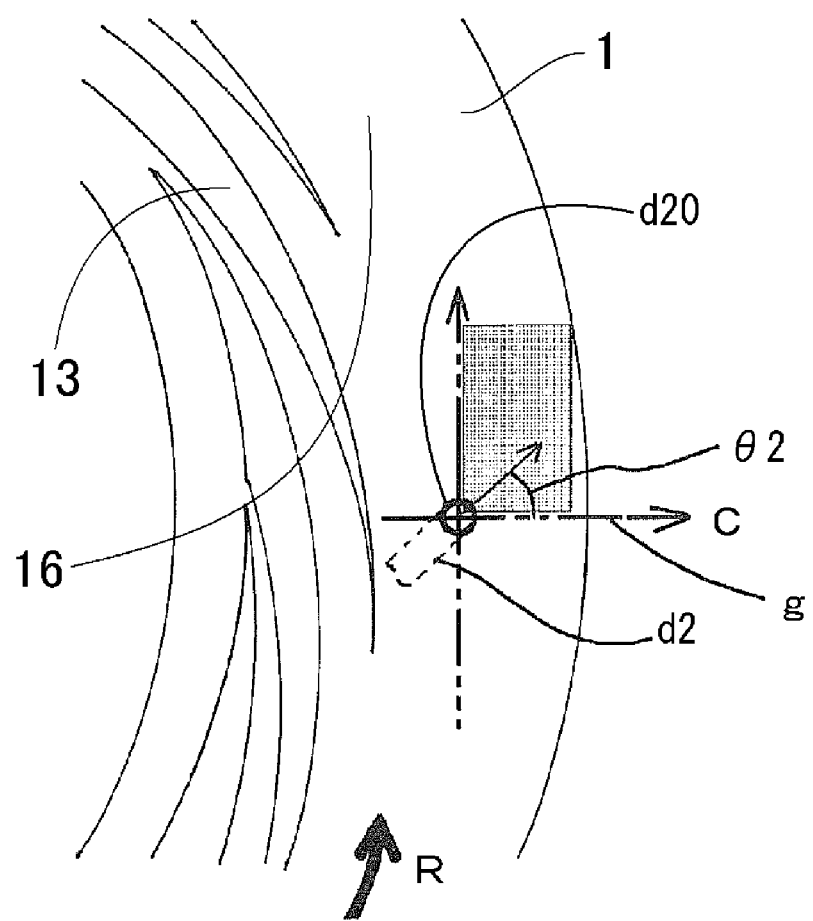

The fluid processing apparatus shown in FIG. 1 to FIG. 3 is the apparatus with which a material to be processed is processed between processing surfaces in processing members arranged so as to be able to approach to and separate from each other, at least one of which rotates relative to the other; wherein, of the fluids to be processed, a first fluid to be processed, i.e., a first fluid, is introduced into between the processing surfaces, and a second fluid to be processed, i.e., a second fluid, is introduced into between the processing surfaces from a separate path that is independent of the flow path introducing the first fluid and has an opening leading to a space between the processing surfaces, whereby the first fluid and the second fluid are mixed and stirred between the processing surfaces. Meanwhile, in FIG. 1, a reference character U indicates an upside and a reference character S indicates a downside; however, up and down, frond and back and right and left shown therein indicate merely a relative positional relationship and does not indicate an absolute position. In FIG. 2(A) and FIG. 3(B), a reference character R indicates a rotational direction. In FIG. 3(B), a reference character C indicates a direction of centrifugal force (a radial direction).

In this apparatus provided with processing surfaces arranged opposite to each other so as to be able to approach to and separate from each other, at least one of which rotates relative to the other, at least two kinds of fluids to be processed are used as the fluid to be processed, wherein at least one fluid thereof contains at least one kind of material to be processed, a thin film fluid is formed by converging the respective fluids between these processing surfaces, and the material to be processed is processed in this thin film fluid. With this apparatus, a plurality of fluids to be processed may be processed as mentioned above; but a single fluid to be processed may be processed as well.

This fluid processing apparatus is provided with two processing members of a first processing member 10 and a second processing member 20 arranged opposite to each other, wherein at least one of these processing members rotates. The surfaces arranged opposite to each other of the respective processing members 10 and 20 are made to be the respective processing surfaces. The first processing member 10 is provided with a first processing surface 1 and the second processing member 20 is provided with a second processing surface 2.

The processing surfaces 1 and 2 are connected to a flow path of the fluid to be processed and constitute part of the flow path of the fluid to be processed. Distance between these processing surfaces 1 and 2 can be changed as appropriate; and thus, the distance thereof is controlled so as to form a minute space usually less than 1 mm, for example, in the range of about 0.1 μm to about 50 μm. With this, the fluid to be processed passing through between the processing surfaces 1 and 2 becomes a forced thin film fluid forced by the processing surfaces 1 and 2.

When a plurality of fluids to be processed are processed by using this apparatus, the apparatus is connected to a flow path of the first fluid to be processed whereby forming part of the flow path of the first fluid to be processed; and part of the flow path of the second fluid to be processed other than the first fluid to be processed is formed. In this apparatus, the two paths converge into one, and two fluids to be processed are mixed between the processing surfaces 1 and 2 so that the fluids may be processed by reaction and so on. It is noted here that the term "process (ing)" includes not only the embodiment wherein a material to be processed is reacted but also the embodiment wherein a material to be processed is only mixed or dispersed without accompanying reaction.

To specifically explain, this apparatus is provided with a first holder 11 for holding the first processing member 10, a second holder 21 for holding the second processing member 20, a surface-approaching pressure imparting mechanism, a rotation drive member, a first introduction part d1, a second introduction part d2, and a fluid pressure imparting mechanism p.

As shown in FIG. 2(A), in this embodiment, the first processing member 10 is a circular body, or more specifically a disk with a ring form. Similarly, the second processing member 20 is a disk with a ring form. A material of the processing members 10 and 20 is not only metal but also ceramics, sintered metal, abrasion-resistant steel, sapphire, other metal subjected to hardening treatment, and rigid material subjected to lining, coating, or plating. In the processing members 10 and 20 of this embodiment, at least part of the first and the second surfaces 1 and 2 arranged opposite to each other is mirror-polished.

Roughness of this mirror polished surface is not particularly limited; but surface roughness Ra is preferably 0.01 μm to 1.0 μm, or more preferably 0.03 μm to 0.3 μm.

At least one of the holders can rotate relative to the other holder by a rotation drive mechanism such as an electric motor (not shown in drawings). A reference numeral 50 in FIG. 1 indicates a rotary shaft of the rotation drive mechanism; in this embodiment, the first holder 11 attached to this rotary shaft 50 rotates, and thereby the first processing member 10 attached to this first holder 11 rotates relative to the second processing member 20. As a matter of course, the second processing member 20 may be made to rotate, or the both may be made to rotate. Further in this embodiment, the first and second holders 11 and 21 may be fixed, while the first and second processing members 10 and 20 may be made to rotate relative to the first and second holders 11 and 21.

At least any one of the first processing member 10 and the second processing member 20 is able to approach to and separate from at least any other member, thereby the processing surfaces 1 and 2 are able to approach to and separate from each other.

In this embodiment, the second processing member 20 approaches to and separates from the first processing member 10, wherein the second processing member 20 is accepted in an accepting part 41 arranged in the second holder 21 so as to be able to rise and set. However, as opposed to the above, the first processing member 10 may approach to and separate from the second processing member 20, or both of the processing members 10 and 20 may approach to and separate from each other.

This accepting part 41 is a concave portion for mainly accepting that side of the second processing member 20 opposite to the second processing surface 2, and this concave portion is a groove being formed into a circle, i.e., a ring when viewed in a plane. This accepting part 41 accepts the second processing member 20 with sufficient clearance so that the second processing member 20 may rotate. Meanwhile, the second processing member 20 may be arranged so as to be movable only parallel to the axial direction; alternatively, the second processing member 20 may be made movable, by making this clearance larger, relative to the accepting part 41 so as to make the center line of the processing member 20 inclined, namely unparallel, to the axial direction of the accepting part 41, or movable so as to deviate the center line of the processing member 20 and the center line of the accepting part 41 toward the radius direction.

It is preferable that the second processing member 20 be accepted by a floating mechanism so as to be movable in the three dimensional direction, as described above.

The fluids to be processed are introduced into between the processing surfaces 1 and 2 from the first introduction part d1 and the second introduction part d2 under the state that pressure is applied thereto by a fluid pressure imparting mechanism p consisting of various pumps, potential energy, and so on. In this embodiment, the first introduction part d1 is a flow path arranged in the center of the circular second holder 21, and one end thereof is introduced into between the processing surfaces 1 and 2 from inside the circular processing members 10 and 20. Through the second introduction part d2, the second fluid to be processed for reaction to the first fluid to be processed is introduced into between the processing surfaces 1 and 2. In this embodiment, the second introduction part d2 is a flow path arranged inside the second processing member 20, and one end thereof is open at the second processing surface 2. The first fluid to be processed which is pressurized with the fluid pressure imparting mechanism p is introduced from the first introduction part d1 to the space inside the processing members 10 and 20 so as to pass through between the first and second processing surfaces 1 and 2 to outside the processing members 10 and 20. From the second introduction part d2, the second fluid to be processed which is pressurized with the fluid pressure imparting mechanism p is provided into between the processing surfaces 1 and 2, whereat this fluid is converged with the first fluid to be processed, and there, various fluid processing such as mixing, stirring, emulsification, dispersion, reaction, deposition, crystallization, and separation are effected, and then the fluid thus processed is discharged from the processing surfaces 1 and 2 to outside the processing members 10 and 20. Meanwhile, an environment outside the processing members 10 and 20 may be made negative pressure by a vacuum pump.

The surface-approaching pressure imparting mechanism mentioned above supplies the processing members with force exerting in the direction of approaching the first processing surface 1 and the second processing surface 2 each other. In this embodiment, the surface-approaching pressure imparting mechanism is arranged in the second holder 21 and biases the second processing member 20 toward the first processing member 10.

The surface-approaching pressure imparting mechanism is a mechanism to generate a force (hereinafter "surface-approaching pressure") to press the first processing surface 1 of the first processing member 10 and the second processing surface 2 of the second processing member 20 in the direction to make them approach to each other. By the balance between this surface-approaching pressure and the force to separate the processing surfaces 1 and 2 from each other, i.e., the force such as the fluid pressure, a thin film fluid having minute thickness in a level of nanometer or micrometer is generated. In other words, the distance between the processing surfaces 1 and 2 is kept in a predetermined minute distance by the balance between these forces.

In the embodiment shown in FIG. 1, the surface-approaching pressure imparting mechanism is arranged between the accepting part 41 and the second processing member 20. Specifically, the surface-approaching pressure imparting mechanism is composed of a spring 43 to bias the second processing member 20 toward the first processing member 10 and a biasing-fluid introduction part 44 to introduce a biasing fluid such as air and oil, wherein the surface-approaching pressure is provided by the spring 43 and the fluid pressure of the biasing fluid. The surface-approaching pressure may be provided by any one of this spring 43 and the fluid pressure of this biasing fluid; and other forces such as magnetic force and gravitation may also be used. The second processing member 20 recedes from the first processing member 10 thereby making a minute space between the processing surfaces by separating force, caused by viscosity and the pressure of the fluid to be processed applied by the fluid pressure imparting mechanism p, against the bias of this surface-approaching pressure imparting mechanism. By this balance between the surface-approaching pressure and the separating force as mentioned above, the first processing surface 1 and the second processing surface 2 can be set with the precision of a micrometer level; and thus the minute space between the processing surfaces 1 and 2 may be set. The separating force mentioned above includes fluid pressure and viscosity of the fluid to be processed, centrifugal force by rotation of the processing members, negative pressure when negative pressure is applied to the biasing-fluid introduction part 44, and spring force when the spring 43 works as a pulling spring. This surface-approaching pressure imparting mechanism may be arranged also in the first processing member 10, in place of the second processing member 20, or in both of the processing members.

To specifically explain the separation force, the second processing member 20 has the second processing surface 2 and a separation controlling surface 23 which is positioned inside the processing surface 2 (namely at the entering side of the fluid to be processed into between the first and second processing surfaces 1 and 2) and next to the second processing surface 2. In this embodiment, the separation controlling surface 23 is an inclined plane, but may be a horizontal plane. The pressure of the fluid to be processed acts to the separation controlling surface 23 to generate force directing to separate the second processing member 20 from the first processing member 10. Therefore, the second processing surface 2 and the separation controlling surface 23 constitute a pressure receiving surface to generate the separation force.

In the example shown in FIG. 1, an approach controlling surface 24 is formed in the second processing member 20. This approach controlling surface 24 is a plane opposite, in the axial direction, to the separation controlling surface 23 (upper plane in FIG. 1) and, by action of pressure applied to the fluid to be processed, generates force of approaching the second processing member 20 toward the first processing member 10.

Meanwhile, the pressure of the fluid to be processed exerted on the second processing surface 2 and the separation controlling surface 23, i.e., the fluid pressure, is understood as force constituting an opening force in a mechanical seal. The ratio (area ratio A1/A2) of a projected area A1 of the approach controlling surface 24 projected on a virtual plane perpendicular to the direction of approaching and separating the processing surfaces 1 and 2, that is, to the direction of rising and setting of the second processing member 20 (axial direction in FIG. 1), to a total area A2 of the projected area of the second processing surface 2 of the second processing member 20 and the separation controlling surface 23 projected on the virtual plane is called as balance ratio K, which is important for control of the opening force. This opening force can be controlled by the pressure of the fluid to be processed, i.e., the fluid pressure, by changing the balance line, i.e., by changing the area A1 of the approach controlling surface 24.

Sliding surface actual surface pressure P, i.e., the fluid pressure out of the surface-approaching pressures, is calculated according to the following equation:

$$P = P1 \times (K - k) + Ps$$

Here, P1 represents the pressure of a fluid to be processed, i.e., the fluid pressure, K represents the balance ratio, k represents an opening force coefficient, and Ps represents a spring and back pressure.

By controlling this balance line to control the sliding surface actual surface pressure P, the space between the processing surfaces 1 and 2 is formed as a desired minute space, thereby forming a fluid film of the fluid to be processed so as to make the processed substance such as a product fine and to effect uniform processing by reaction.

Meanwhile, the approach controlling surface 24 may have a larger area than the separation controlling surface 23, though this is not shown in the drawing.

The fluid to be processed becomes a forced thin film fluid by the processing surfaces 1 and 2 that keep the minute space therebetween, whereby the fluid is forced to move out from the circular, processing surfaces 1 and 2. However, the first processing member 10 is rotating; and thus, the mixed fluid to be processed does not move linearly from inside the circular, processing surfaces 1 and 2 to outside thereof, but does move spirally from the inside to the outside thereof by a resultant vector acting on the fluid to be processed, the vector being composed of a moving vector toward the radius direction of the circle and a moving vector toward the circumferential direction.

Meanwhile, a rotary shaft 50 is not only limited to be placed vertically, but may also be placed horizontally, or at a slant. This is because the fluid to be processed is processed in a minute space between the processing surfaces 1 and 2 so that the influence of gravity can be substantially eliminated. In addition, this surface-approaching pressure imparting mechanism can function as a buffer mechanism of microvibration and rotation alignment by concurrent use of the foregoing floating mechanism with which the second processing member 20 may be held displaceably.

In the first and second processing members 10 and 20, the temperature thereof may be controlled by cooling or heating at least any one of them; in FIG. 1, an embodiment having temperature regulating mechanisms J1 and J2 in the first and second processing members 10 and 20 is shown. Alternatively, the temperature may be regulated by cooling or heating the introducing fluid to be processed. These temperatures may be used to separate the processed substance or may be set so as to generate Benard convection or Marangoni convection in the fluid to be processed between the first and second processing surfaces 1 and 2.

As shown in FIG. 2, in the first processing surface 1 of the first processing member 10, a groove-like depression 13 extended toward an outer side from the central part of the first processing member 10, namely in a radius direction, may be formed. The depression 13 may be, as a plane view, curved or spirally extended on the first processing surface 1 as shown in FIG. 2(B), or, though not shown in the drawing, may be extended straight radially, or bent at a right angle, or jogged; and the depression may be continuous, intermittent, or branched. In addition, this depression 13 may be formed also on the second processing surface 2, or on both of the first and second processing surfaces 1 and 2. By forming the depression 13 as mentioned above, the micro-pump effect can be obtained so that the fluid to be processed may be sucked into between the first and second processing surfaces 1 and 2.

The base end of the depression 13 reaches preferably inner circumference of the first processing member 10. The front end of the depression 13 extends in an outer circumferential direction of the first processing surface 1 with the depth thereof (cross-sectional area) being gradually shallower as going from the base end toward the front end.

Between the front end of the depression 13 and the outer periphery of the first processing surface 1 is arranged a flat surface 16 not having the depression 13.

When an opening d20 of the second introduction part d2 is arranged in the second processing surface 2, the arrangement is done preferably at a position opposite to the flat surface 16 of the first processing surface 1 arranged at a position opposite thereto.

This opening d20 is arranged preferably in the downstream (outside in this case) of the depression 13 of the first processing surface 1. The opening is arranged especially preferably at a position opposite to the flat surface 16 located nearer to the outer diameter than a position where the direction of flow upon introduction by the micro-pump effect is changed to the direction of a spiral and laminar flow formed between the processing surfaces. Specifically, in FIG. 2(B), a distance n from the outermost side of the depression 13 arranged in the first processing surface 1 in the radial direction is preferably about 0.5 mm or more. Especially in the case of separating nanoparticles (nanosized particles) from a fluid, it is preferable that mixing of a plurality of fluids to be processed and separation of the nanoparticles therefrom be effected under the condition of a laminar flow.

This second introduction part d2 may have directionality. For example, as shown in FIG. 3(A), the direction of introduction from the opening d20 of the second processing surface 2 is inclined at a predetermined elevation angle ($\theta 1$) relative to the second processing surface 2. The elevation angle ($\theta 1$) is set at more than 0° and less than 90°, and when the reaction speed is high, the angle ($\theta 1$) is preferably set in the range of 1° to 45°.

In addition, as shown in FIG. 3(B), introduction from the opening d20 of the second processing surface 2 has directionality in a plane along the second processing surface 2. The direction of introduction of this second fluid is in the outward direction departing from the center in a radial component of the processing surface and in the forward direction in a rotation component of the fluid between the rotating processing surfaces. In other words, a predetermined angle ($\theta 2$) exists facing the rotation direction R from a reference line g, which is the line to the outward direction and in the radial direction passing through the opening d20. This angle ($\theta 2$) is also set preferably at more than 0° and less than 90°.

This angle ($\theta 2$) can vary depending on various conditions such as the type of fluid, the reaction speed, viscosity, and the rotation speed of the processing surface. In addition, it is also possible not to give the directionality to the second introduction part d2 at all.

In the embodiment shown in FIG. 1, kinds of the fluid to be processed and numbers of the flow path thereof are set two respectively; but they may be one, or three or more. In the embodiment shown in FIG. 1, the second fluid is introduced into between the processing surfaces 1 and 2 from the introduction part d2; but this introduction part may be arranged in the first processing member 10 or in both. Alternatively, a plurality of introduction parts may be arranged relative to one fluid to be processed. The opening for introduction arranged in each processing member is not particularly restricted in its form, size, and number; and these may be changed as appropriate. The opening of the introduction part may be arranged just before the first and second processing surfaces 1 and 2 or in the side of further upstream thereof.

Meanwhile, because it is good enough only if the foregoing treatment could be effected between the processing surfaces 1 and 2, as opposed to the foregoing method, a method wherein the second fluid is introduced from the first introduction part d1 and the first fluid is introduced from the second introduction part d2 may also be used. That is, the expression "first" or "second" for each fluid has a meaning for merely discriminating an $n^{th}$ fluid among a plurality of the fluids present; and therefore, a third or more fluids can also exist.

In the apparatus mentioned above, treatment such as separation and deposition, or crystallization takes place under a forced and uniform mixing between the processing surfaces 1 and 2 arranged opposite to each other so as to be able to approach to and separate from each other, at least one of which rotates relative to the other, as shown in FIG. 1. A particle diameter and mono-dispersibility of the processed material can be controlled by appropriately controlling rotation number of the processing members 10 and 20, fluid velocity, distance between the processing surfaces 1 and 2, raw material concentration in the fluid to be processed, a kind of solvent used in the fluid to be processed, and so on.

In this apparatus, various treatment, such as dispersion, emulsification, reaction, and separation, which have been done in a usual apparatus for reaction, dispersion, emulsification, or a microreactor, can be done by mixing and stirring a single fluid or a plurality of fluids. As a result of this treatment, in the case of obtaining particles, not only particles of micrometer size but also particles of nanosize can be obtained. This apparatus can be used not only to produce particles but to carry out a reaction in a fluid regardless of whether or not particles are produced therein. In a method to produce particles, large sized particles in a fluid to be processed that is introduced into between the processing surfaces 1 and 2 may be broken down to small sized particles; alternatively, a material dissolved or dispersed in a fluid to be processed that is introduced into between the processing surfaces 1 and 2 may be separated; or still alternatively, build-up treatment to obtain a new particle compound by reacting a fluid to be processed that is introduced into between the processing surfaces 1 and 2 may be carried out. An illustrative example of the build-up treatment for separation includes an acid pasting method, a pH-adjusting method, a reduction reaction method, a separation method by changing concentration or temperature, and a separation method by an organic reaction. A kind of the particles is not restricted, therefore including metal or a metal compound, an organic compound, and an inorganic compound; and thus, this apparatus can be used to obtain various nanoparticles such as, for example, metal-supported carbon; fullerene nanowhiskers/nanofiber nanotubes; biologically ingestible substances including pharmaceutical products, drugs to plants and animals, agricultural chemicals and foods; pigments; ceramics; semiconductor fine particles; titanium dioxide; magnetic bodies, resin, and emulsion.

Figure 4:
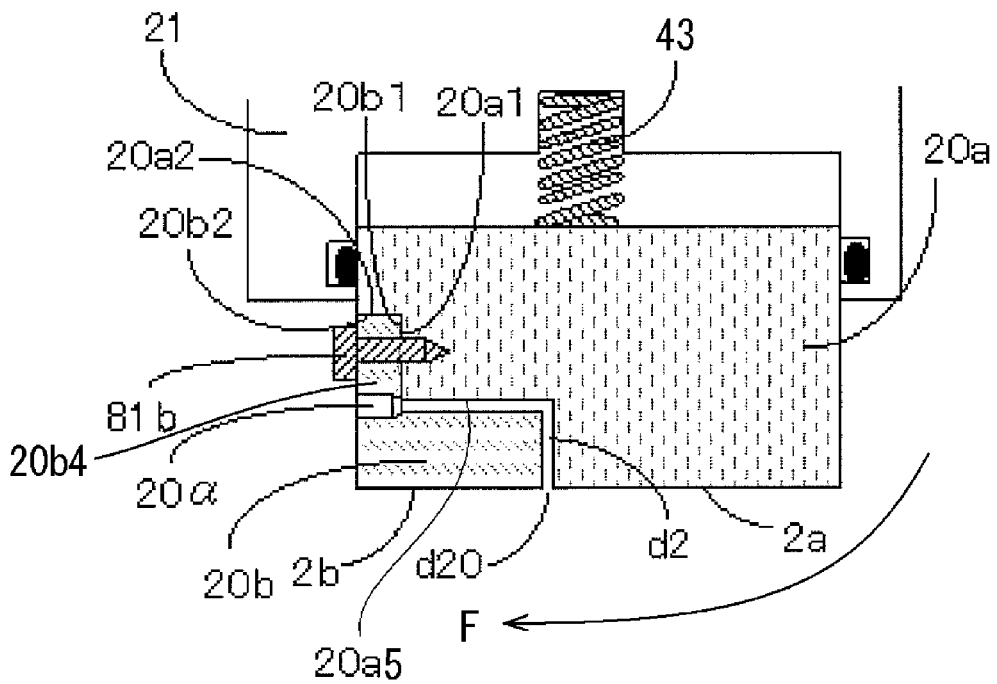
FIG. 4(A) is a sectional view of an important part of the second processing member and the second holder of the fluid processing apparatus according to an embodiment of the present invention.
FIG. 4(B) is a sectional view of an important part of the second processing member of the fluid processing apparatus according to another embodiment of the present invention; each of FIG. 4(C) to FIG. 4(D) is a sectional view of an important part of the second processing member of the fluid processing apparatus according to still other embodiment of the present invention.
FIG. 4(E) is an oblique perspective view of an important part of the second component of the processing member used in FIG. 4(C) to FIG. 4(D).
Figure 4:
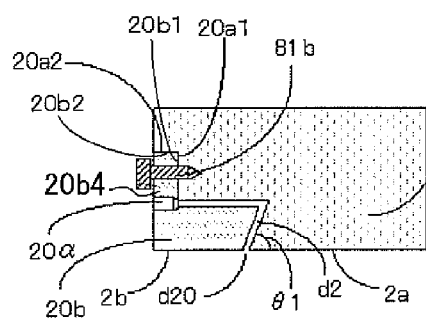
Figure 4:
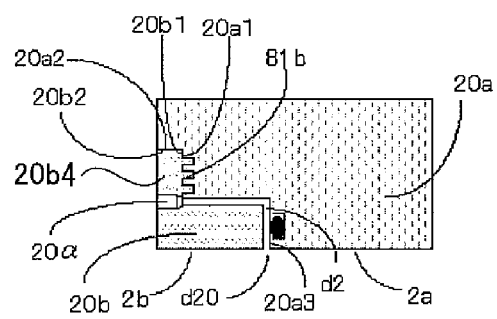
Figure 4:
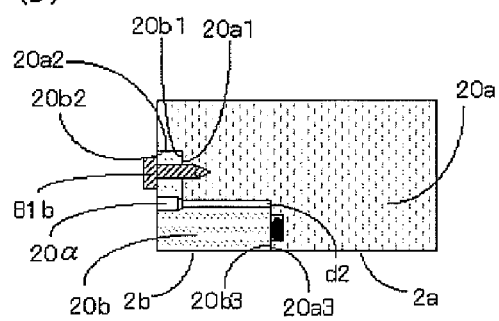
Figure 4:
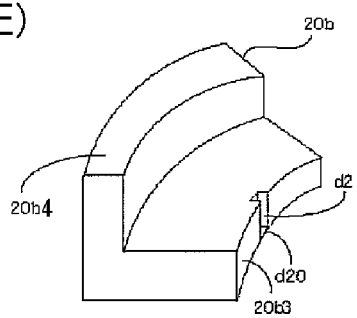
Figure 5:
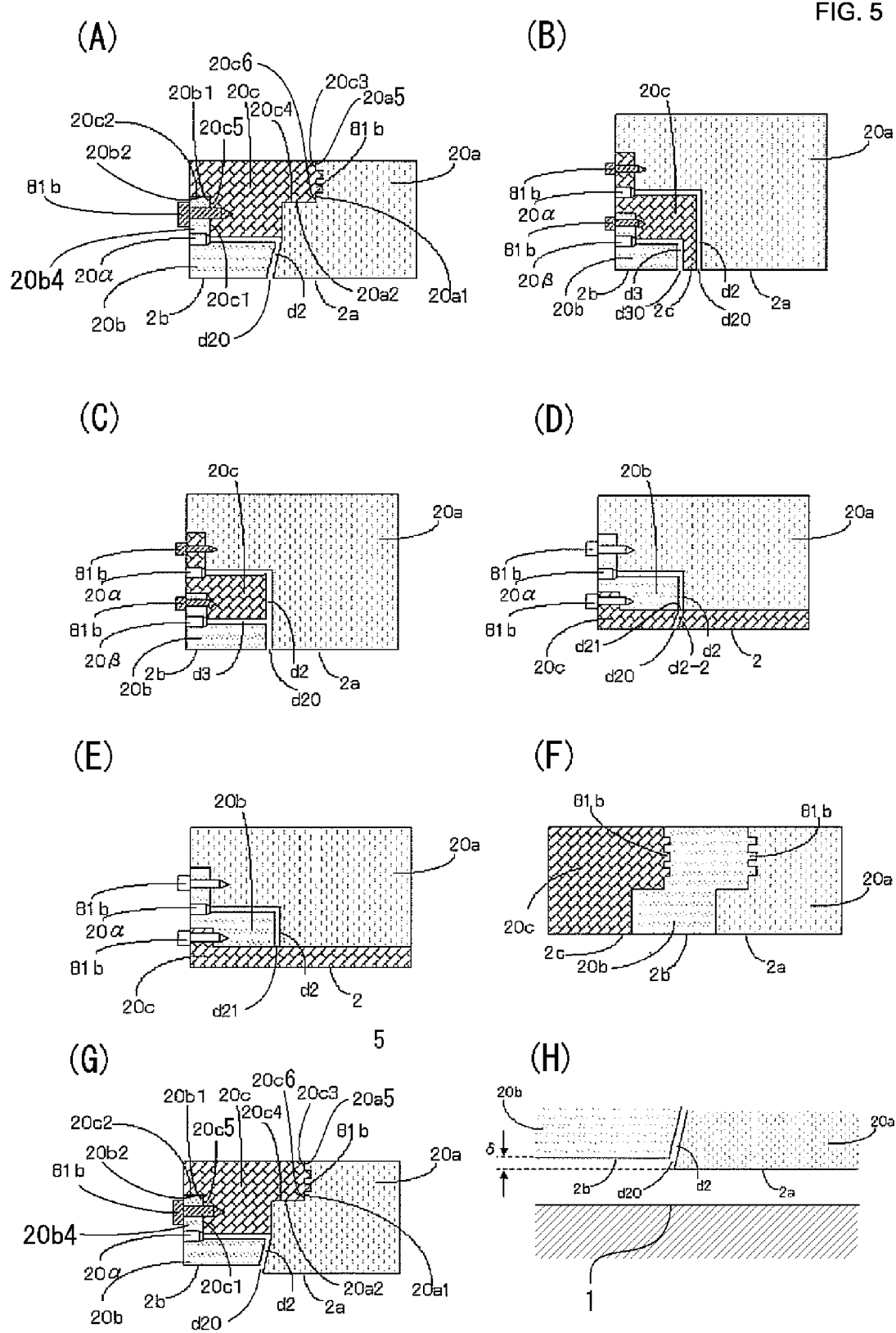
FIG. 5(H) is an enlarged view of FIG. 5(G).

The present invention is characterized in that a component of the processing member that constitutes the first or the second processing member 10 or 20 in the foregoing processing apparatus is composed of a plurality of first components 20a of the processing member and second components 20b of the processing member. Meanwhile, in the embodiments shown in FIG. 4 to FIG. 7, explanation is made on the component that constitutes the second processing member 20; but the component that constitutes the first processing member 10 may be composed of a plurality of the components of the processing member as well. In FIG. 4(A), F shows the introduction direction of the fluid to be processed.

Firstly, FIG. 4(A) is a rough sectional view of a vicinity of the processing member 20 in FIG. 1. The processing member 20 supported by second holder 21 comprises the first and second components 20a and 20b of the processing member. On outer circumferential surface of the second component 20b of the processing member is arranged a nozzle 20a. In the first and second components 20a and 20b of the processing member are formed fixing edge surfaces, which correspond to fixing edge surfaces 20a1 and 20b1 for the radial direction and fixing edge surfaces 20a2 and 20b2 for the axial direction in the first and second components 20a and 20b of the processing member in FIG. 4(A).

In more detail, the first component 20a of the processing member has a disk shape with a ring form, wherein an inner peripheral side of the one edge surface thereof (lower edge surface in the drawing) constitutes a part 2a of the processing surface 2. In an outer peripheral side of this one edge surface of the first component 20a of the processing member (lower edge surface in the drawing) is formed depression 20a5 having a circular form; and on this depression 20a5 is arranged the second component 20b of the processing member. This second component 20b of the processing member also has a disk shape with a ring form, wherein the one edge surface thereof (lower edge surface in the drawing) constitutes another part 2b of the processing surface 2; and the processing surface 2 is composed of the processing surface 2a of the first component 20a of the processing member and the processing surface 2b of the second component 20b of the processing member. This second component 20b of the processing member is provided with a position-determining part 20b4 at the opposite side of the processing surface 2b (upper side of the drawing). This position-determining part 20b4 is provided with the fixing edge surface 20b1 for the radial direction and the fixing edge surface 20b2 for the axial direction. This fixing edge surface 20b1 for the radial direction is the edge surface extending along the direction crossing with the radial direction of this processing member 20; and in the first component 20a of the processing member is formed the fixing edge surface 20a1 for the radial direction in substantially parallel to this fixing edge surface 20b1 for the radial direction. The fixing edge surface 20b2 for the axial direction is the edge surface extending toward the direction crossing with the axial direction of this processing member 20; and in the first component 20a of the processing member is formed the fixing edge surface 20a2 for the axial direction in parallel to this fixing edge surface 20b2 for the axial direction. Meanwhile, an inclined surface crossing with both of the axial direction and the radial direction may be formed as a synthesized edge surface of the fixing edge surfaces 20a1 and 20b1 for the radial direction and the fixing edge surfaces 20a2 and 20b2 for the axial direction. This position-determining part 20b4 may be formed in part of the circumferential direction or in such a manner to make a circuit in entire circumference.

Assembly is made such that the fixing edge surfaces 20a1 and 20b1 for the radial direction of the first and second components 20a and 20b of the processing member may be adhered to each other and that the fixing edge surfaces 20a2 and 20b2 for the axial direction thereof may be adhered to each other. Thereafter, both of the components 20a and 20b of the processing member are fixed by component fixing mechanism 81b of the processing member. By doing so, the first and second components 20a and 20b of the processing member are integrated to compose the processing member 20. Disassembly may be done by the inverse process to the foregoing assembly and integration.

In this embodiment of FIG. 4(A), a flow path d2 (second introduction part) provided with the opening d20 to introduce the second fluid between the processing surfaces 1 and 2 is formed by assembling the first and second components 20a and 20b of the processing member; and this second introduction part d2 is connected to a nozzle 20a. A diameter or clearance of the opening d20 or of the flow path d2 can be determined by adjusting a design size of the first and second components 20a and 20b of the processing member under the fixing state of both of the components 20a and 20b of the processing member by using the forgoing component fixing mechanism 81b of the processing member.

In the embodiment of the present invention, there is a merit that pressure loss to introduce the second fluid can be reduced by having the diameter or the clearance of the opening d20 made to the diameter or the clearance to carry out the intended treatment, while having the diameter or the clearance of the flow path d2 to the opening d20 made larger than the diameter or the clearance of the opening d20.

In addition, though not particularly restricted, various tubes to introduce the second fluid may be fixed to the nozzle 20a by a flareless joint. An illustrative example of the other fixing method includes those using a clamp, a saddle band, a strap, and a bracket. The second fluid is introduced into the flow path d2 and then into between the processing surfaces 1 and 2 through the opening d20 by a pneumatic transportation system with a pump and air by using the fluid pressure imparting mechanism p.

In the present invention, as mentioned above, the second processing member 20 is constituted of a plurality of the components 20a and 20b of the processing member, and pressure is applied to the processing members 10 and 20 by the fluid pressure imparting mechanism p and the surface-approaching pressure imparting mechanism; and thus, a sealing mechanism such as an O-ring may be arranged to avoid leaking of the fluid to be processed that is introduced into between the processing surfaces 1 and 2 (not shown in the drawing). Similarly, in order to avoid leaking of air or a fluid, such as an oil used when the pressure is applied, the sealing mechanism such as an O-ring may be arranged. For example, the sealing mechanism such as an O-ring may be arranged in the fixing edge surfaces 20a1 and 20b1. The sealing mechanism may be arranged in other than the above examples as necessary.

The component fixing mechanism 81b of the processing member may take fixing methods such as those using a screw as shown in FIG. 4(C) and a bolt, though not particularly limited to them; in the embodiment of FIG. 4(A), a screw hole and the like is formed in the position-determining part 20b4 and the first component 20a of the processing member thereby fixing the position-determining part 20b4 of the second component 20b of the processing member and the first component 20a of the processing member by bolt 81b. In this component fixing mechanism 81b of the processing member, the fixing method by a screw includes a shrink fit and a spigot-and-recess, in addition to a screw. Accordingly, assembly and fixing of both of the components 20a and 20b of the processing member can be carried out even substantially at the same time.

Figure 6:
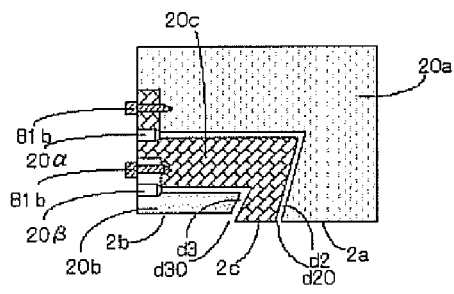
FIG. 6(D) is a plane view of the second processing member in FIG. 6(C); and each of FIG. 6(E)
FIG. 6(F) is a sectional view of an important part of the second processing member of the fluid processing apparatus according to still other embodiment of the present invention.
Figure 6:
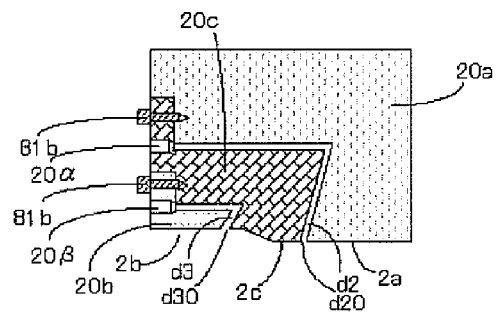
Figure 6:
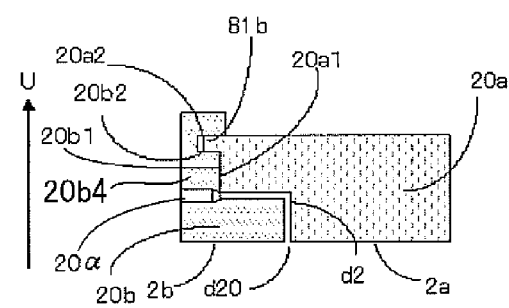
Figure 6:
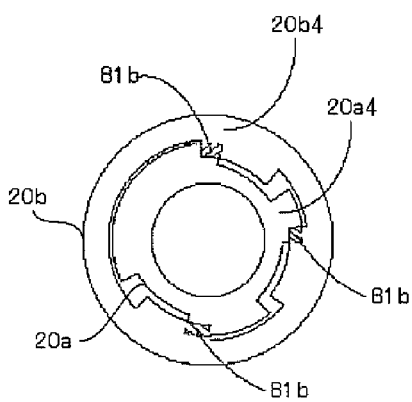
Figure 6:
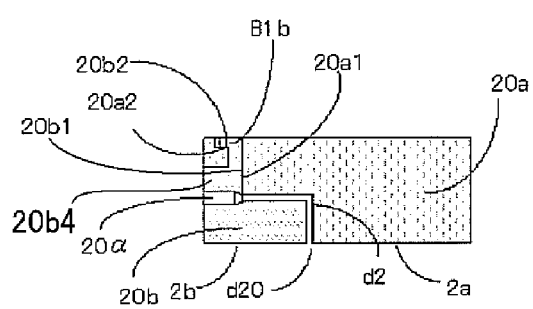
Figure 6:
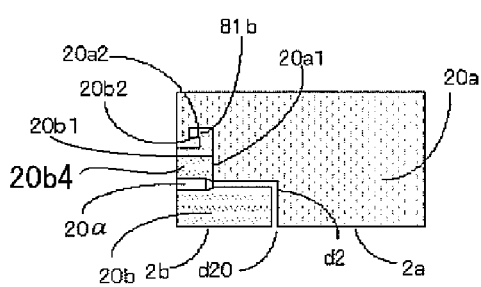

Next, one example of other embodiments of the present invention will be explained. Meanwhile, the same reference numeral is given to the same part so as to omit detailed explanation thereof. Another embodiment may be carried out by an assembling method as shown by FIGS. 6(C) and 6(D). In FIGS. 6(C) and 6(D), only the components constituting the processing member 20 are shown. One example is specifically explained. FIG. 6(D) is a rough plane view of the axial direction in the component fixing mechanism 81b of the processing member in the second processing member 20 shown in FIG. 6 (C). As shown in the drawings, the first and second components 20a and 20b of the processing member are assembled, and then the first and second components 20a and 20b of the processing member are rotated relative to the other, whereby they are integrated in the shaded part by the component fixing mechanism 81b of the processing member arranged in the components of the processing member (fitting at the shaded part in FIG. 6(D)). In this embodiment, though not particularly restricted, the component fixing mechanism 81b of the processing member is effected as a fixing projection 20a4 that is projected to the outward direction radially from the outer circumference part of the first component 20a of the processing member. To this fixing projection 20a4 is formed a vertical channel extended in the axial direction (not shown in the drawing) from the upper edge of FIG. 6(C) in the position-determining part 20b4 of the second component 20b of the processing member; and at the same time, a horizontal channel is formed to the circumferential direction from the bottom edge of this vertical channel (not shown in the drawing). When assembling them, this first component 20a of the processing member is approached to the second component 20b of the processing member in the axial direction, and then the fixing projection 20a4 is inserted into the vertical channel; when it moves to the bottom edge, the first and second components 20a and 20b of the processing member are rotated relative to the other, whereby the fixing projection 20a4 is inserted into the end of the horizontal channel to complete the assembly.

There are following merits, as shown in FIG. 6(D), in that the component fixing mechanism 81b of the processing member are not formed with the same intervals in the circumferential direction. That is, for example, shapes of the flow path d2 and the opening d20 formed after the assembly or simultaneously with the assembly can be made constant; and the processing surfaces 2a and 2b comprising different components 20a and 20b of the processing member can be assembled always smoothly. FIGS. 6(E) and 6(F) show another embodiment that the components 20a and 20b of the processing member are integrated by using the same mechanism as FIGS. 6(C) and 6(D).

Material of the components 20a and 20b of the processing member is not particularly restricted. Similarly to the materials shown in Patent Document 1 and Patent Document 2, an illustrative example thereof includes not only metal but also ceramics, sintered metal, abrasion-resistant steel, sapphire, other metal subjected to hardening treatment, and rigid material subjected to lining, coating, or plating. In the present invention, different materials may be selected for each of the components 20a and 20b of the processing member. In the present invention, in the case that the components 20a and 20b of the processing member do not form the processing surfaces 2a and 2b, an inexpensive material is preferably used, in addition to the foregoing materials; and an illustrative example thereof includes stainless steel and fluorine resin such as polytetrafluoroethylene.

It is preferable that the processing surface 2 in the processing member 20 be mirror-processed such as mirror polish. In the embodiment shown in FIG. 4(A), the processing surface 2 comprises the processing surfaces 2a and 2b. In the present invention, in view of forming the uniform processing surfaces it is preferable that the processing surface 2 (2a and 2b) be mirror-processed simultaneously as the one unit, after a plurality of the divided components 20a and 20b of the processing member are assembled and integrated.

In the above, the description was made as to the method in which the processing member 20 was composed by assembling a plurality of the divided components 20a and 20b of the processing member and then fixing or integrating them; but it can be seen that the processing member 20 provided with the second introduction part d2 having a circular opening d20 in the processing surface 2 can be easily formed by using a composition method of the processing member 20 of the present invention.

Further in addition, still other embodiments other than the above embodiments will be explained. Meanwhile, the same reference numeral is given to the same part so as to omit detailed explanation thereof. As to the embodiments other than FIG. 4(A) and FIG. 7, only the components composing the processing member 20 will be described. FIG. 4(B) shows one embodiment of the case that, in the second introduction part d2, its introduction direction from the opening d20 of the second processing surface 2 is inclined by a predetermined angle ($\theta 1$) against the second processing surface 2. This angle ($\theta 1$) is set more than zero degree and less than 90 degrees. Meanwhile, if assembly thereof is difficult, the processing member 20 may be further divided into a plurality of the members in the axial or the radial direction.

As shown in FIG. 3(B), the introduction direction from the opening d20 of the second processing surface 2 has directionality along a plane of the second processing surface 2. This introduction direction of the second fluid is toward outer direction from the center in the radial direction component of the processing surface, and the forward direction in the rotational direction component of the fluid between the rotating surfaces. In other words, a predetermined angle ($\theta 2$) exists toward the rotational direction R from a reference line g, which is the line in the outward and radial direction passing through the opening d20.

The embodiment shown in FIGS. 4(C) and 4(D) is regarding the case that the second component 20b of the processing member as shown in FIG. 4(E) is used in the second component 20b of the processing member. The second component 20b of the processing member shown in FIG. 4(E) is arranged with a depression d2 in an edge surface 20b3. This depression d2 forms, by assembling the first and second components 20a and 20b of the processing member, part of the second introduction part d2 wherein the depression d2 of the edge surface 20b3 is provided with the opening d20. To the part not having the depression d2 in the edge surface 20b3 may be assembled the processing member 20 by further adhering the edge surface 20b3 to the edge surface 20a3 in the first component 20a of the processing member in FIGS. 4(C) and 4(D). By the composition mentioned above, the depression d2 may be made part of the second introduction part d2 having the single opening d20, not the second introduction part d2 having the circular opening d20. In addition, by arranging the edge surface 20a3 in the processing member 20a with the sealing mechanism such as an O-ring, leakage of the fluid to be processed that is introduced into between the processing surfaces 1 and 2 may be avoided under the pressurized state by the fluid pressure imparting mechanism p. Even if the sealing mechanism such as an O-ring is not arranged, the same effect as the case of using the sealing mechanism such as an O-ring may be obtained by size-adjustment or the like of the first and second components 20a and 20b of the processing member under the fixed state of both of the components 20a and 20b of the processing member by the component fixing mechanism 81b of the processing member; and thus, arrangement of the sealing mechanism is not particularly restricted. When a plurality of the single second introduction parts d2 is needed, this can be done by forming a plurality of the depressions d2. In addition, FIG. 4 (C) shows one embodiment that the components 20a and 20b of the processing member are screw-processed as the component fixing mechanism 81b of the processing member.

As shown above, the components 20a and 20b of the processing member that constitute the processing member 20 may be divided into the radial direction components, or into the axial direction components, in the apparatus shown in FIG. 1. In addition, as to the sealing mechanism such as an O-ring, a mechanism other than those shown above may be arranged as necessary.

FIG. 5(A) shows the embodiment that the processing member comprises three components 20a, 20b, and 20c of the processing member. The first component 20a of the processing member shown in FIG. 4(B) is divided into the radial direction components of the apparatus shown in FIG. 1, namely into the first component 20a of the processing member of the inner circumferential part and the third component 20c of the processing member of the outer circumferential part. Similarly to the first and second components 20a and 20b of the processing member, the third component 20c of the processing member is arranged with the fixing edge surfaces, which correspond to the fixing edge surfaces 20c1 and 20c3 for the radial direction and the fixing edge surfaces 20c2 and 20c4 for the axial direction in the third component 20c of the processing member shown in FIG. 5(A).

As described before, in the case that the second introduction part d2 is intended to have directionality against the processing surface 2, there is a merit of easy processing and assembling of each of the components 20a, 20b, and 20c of the processing member if the processing member 20 is composed of three or more components 20a, 20b, and 20c of the processing member. Further, in the present embodiment, as to the component fixing mechanism 81b, 81b of the processing member, a plurality of the fixing mechanisms is used by combining them.

In more detail, the first component 20a of the processing member has a disk form of a ring shape, whose one edge surface (bottom edge surface in the drawing) constitutes a part 2a of the processing surface 2. In addition, in the first component 20a of the processing member, a depression 20a5 having a circular form is formed on the upper part of the outer circumferential side thereof; and to this depression 20a5 is arranged the fixing edge surface 20a1 for the radial direction and the fixing edge surface 20a2 for the axial direction. To this depression 20a5 is arranged the third component 20c of the processing member.

In the third component 20c of the processing member too, a circular projection 20c6 having a disk form of a ring shape that is projected toward the inner radial direction is formed on the upper part of the inner circumferential side thereof; and to this projection 20c6 is arranged the fixing edge surfaces 20c3 and 20c4. In addition, in the lower part of the outer circumferential side of the third component 20c of the processing member is formed a circular depression 20c5; and to this depression 20c5 is arranged the fixing edge surfaces 20c1 and 20c2. To this depression 20c5 is arranged the second component 20b of the processing member.

The fixing edge surfaces 20c1 and 20c3 for the radial direction of the third component 20c of the processing member are the edge surfaces extending toward the direction that crosses with the radial direction of this processing member 20, wherein 20c1 is arranged at the depression 20c5 in the outer circumference side thereof and 20c3 is arranged at the projection 20c6 in the inner circumference side thereof. In addition, the fixing edge surface 20c1 for the radial direction and the fixing edge surface 20b1 for the radial direction of the second component 20b of the processing member are arranged substantially in parallel; and the fixing edge surface 20c3 for the radial direction and the fixing edge surface 20a1 for the radial direction of the first component 20a of the processing member are arranged substantially in parallel. The fixing edge surfaces 20c2 and 20c4 for the axial direction of the third component 20c of the processing member is the edge surfaces extending toward the direction that crosses with the axial direction of this processing member 20, wherein 20c2 is arranged at the depression 20c5 in the outer circumference side thereof and 20c4 is arranged at the projection 20c6 in the inner circumference side thereof. In addition, the fixing edge surface 20c2 for the axial direction and the fixing edge surface 20b2 for the axial direction of the second component 20b of the processing member are arranged substantially in parallel; and the fixing edge surface 20c4 for the axial direction and the fixing edge surface 20a2 for the axial direction of the first component 20a of the processing member are arranged substantially in parallel.

Meanwhile, an inclined surface crossing with both the axial direction and the radial direction may be formed as a synthesized edge surface of the fixing edge surfaces 20a1 and 20c3 for the radial direction and the fixing edge surfaces 20a2 and 20c4 for the axial direction; or an inclined surface crossing with both the axial direction and the radial direction may be formed as a synthesized edge surface of the fixing edge surfaces 20b1 and 20c1 for the radial direction and the fixing edge surfaces 20b2 and 20c2 for the axial direction. The projection 20c6 of the third component 20c of the processing member may be formed in part of the circumferential direction or in such a manner to make a circuit in entire circumference, similarly to the position-determining part 20b4 of the second component 20b of the processing member.

At first, assembly is made such that the fixing edge surfaces 20a1 and 20c3 for the radial direction of the first and third components 20a and 20c of the processing member may be adhered to each other and that the fixing edge surfaces 20a2 and 20c4 for the axial direction may be adhered to each other. Thereafter, both of the components 20a and 20c of the processing member are fixed by the component fixing mechanism 81b of the processing member (by a screw). Then, assembly is made such that the fixing edge surfaces 20b1 and 20c1 for the radial direction of the third component 20c of the processing member assembled with the second and first components 20b and 20a of the processing member may be adhered to each other and that the fixing edge surfaces 20b2 and 20c2 for the axial direction may be adhered to each other; and thereafter, both of the components 20b and 20c of the processing member are fixed by the component fixing mechanism 81b of the processing member (by a bolt). By doing so, the first, second, and third components 20a, 20b, and 20c of the processing member are integrated to form the processing member 20.

FIG. 5(B) shows one embodiment that the processing member 20 is composed of the three components 20a, 20b, and 20c of the processing member, and in addition, third introduction part d3 that is a flow path having an opening d30 to introduce a third fluid between the processing surfaces 1 and 2 is arranged in addition to the second introduction part d2. Methods to assemble and fix the components 20a, 20b, and 20c of the processing member are the same as those of FIG. 4(A) and FIG. 5(A), and thus explanation thereof is omitted hereafter. In the outer circumference of the second component 20b of the processing member is formed a nozzle 200, and in the outer circumference of the third component 20c of the processing member is formed a nozzle 20a, respectively; by assembling each of the components 20a, 20b, and 20c of the processing member, the nozzle 20a is connected to the second introduction part d2 having the opening d20 leading to between the processing surfaces 1 and 2, and the nozzle 20β is connected to the third introduction part d3 having the opening d30 leading to between the processing surfaces 1 and 2. In a similar manner, a flow path of fourth or more may be formed.

FIG. 5(C) shows, similarly to FIG. 5(B), one embodiment that the processing member 20 is composed of the three components 20a, 20b, and 20c of the processing member, and in addition, the third introduction part d3 is arranged in addition to the second introduction part d2, and the second and third introduction parts d2 and d3 are converged in the processing member 20. This embodiment is effective, for example, in such a case that there is a need to mix a material contained in the second fluid with a material contained in the third fluid just before introducing them between the processing surfaces 1 and 2.

FIGS. 5(D) and 5(E) show one embodiment that the processing member 20 is composed by assembling the components 20a and 20b of the processing member—arranged with the second flow path d2 having a circular opening d21 and composed by assembling the first and second components 20a and 20b of the processing member—with the third component 20c of the processing member capable of changing the flow path d2 having the circular opening d21 to a second flow path d2-2 having the single opening d20. FIG. 5(D) is a rough sectional view of the component 20c of the processing member arranged with the single second flow path d2-2, and FIG. 5(E) is a rough sectional view of not arranged with the single second flow path d2-2. In such a case that number of the opening d20 leading to between the processing surfaces 1 and 2 is desired to be changed, there is a merit of no need to change the processing member 20 entirely.

FIG. 5(F) shows one embodiment that the processing member is not arranged with the opening d20 and the second introduction part d2. This may be used in the case that the opening d20 and the second introduction part d2 are not necessary in the processing member, for example, in the processing member like the processing member 10 shown in FIG. 1, and may be effectively used, for example, in such a case that a large processing member is necessary because of up-scaling and the like.

FIGS. 5(G) and 5(H) and FIGS. 6(A) and 6(B) show the embodiment that the processing surfaces 2 are not in the same plane in the processing member 20 composed by assembling the divided components 20a, 20b, and 20c of the processing member. FIG. 5(H) is a rough enlarged view of vicinity of the processing surface 2 (2a and 2b) of FIG. 5(G); it has the form that the processing surface 2b in the second component 20b of the processing member thrusts into the opposite side (upper side in the drawing) of the processing member 20 with the distance 6 in the axial direction against the processing surface 2a in the first component 20a of the processing member. In this case, the processing member 2b is arranged, against the processing surface 1 that is arranged opposite thereto, with the distance 6 apart from the processing surface 2a. In this case, there is a merit that a clearance between the processing surfaces 1 and 2 arranged opposite to each other may be partly changed easily; and in addition, simultaneous mirror processing is not necessary. FIGS. 6(A) and 6(B) show one embodiment that the processing surfaces 2 (2a, 2b, and 2c) are not in the same plane, and in addition, the third introduction part d3 is arranged. In this embodiment, the clearance between the processing surfaces 1 and 2 is larger in the mixing part of the first fluid (or a mixture of the first and second fluids) and the third fluid than in the mixing part of the first and second fluids. For example, in the case that charge amount of the third fluid is larger than charge amount of the first and second fluids,— for example, in the case that, after the first and second fluids are mixed between the processing surfaces 1 and 2, the mixture of the first and second fluids needs to be treated with a large amount of the third fluid or with a material contained in the third fluid between the processing surfaces 1 and 2, or in the case that the mixture of the first and second fluids needs to be diluted instantaneously by using the third fluid—there is such a merit of no need to change the clearance between the first processing surface 1 and the second processing surfaces 2 (2a, 2b, and 2c) in the mixing part of the first and second fluids. Alternatively, on contrary to the embodiment shown in FIGS. 6(A) and 6(B), there may be the embodiment that the components 20a, 20b, and 20c of the processing member are formed and assembled such that the mixing part of the first and second fluids may be larger than the mixing part of the first fluid (or a mixture of the first and second fluids) and the third fluid (not shown in the drawing).

Figure 7:
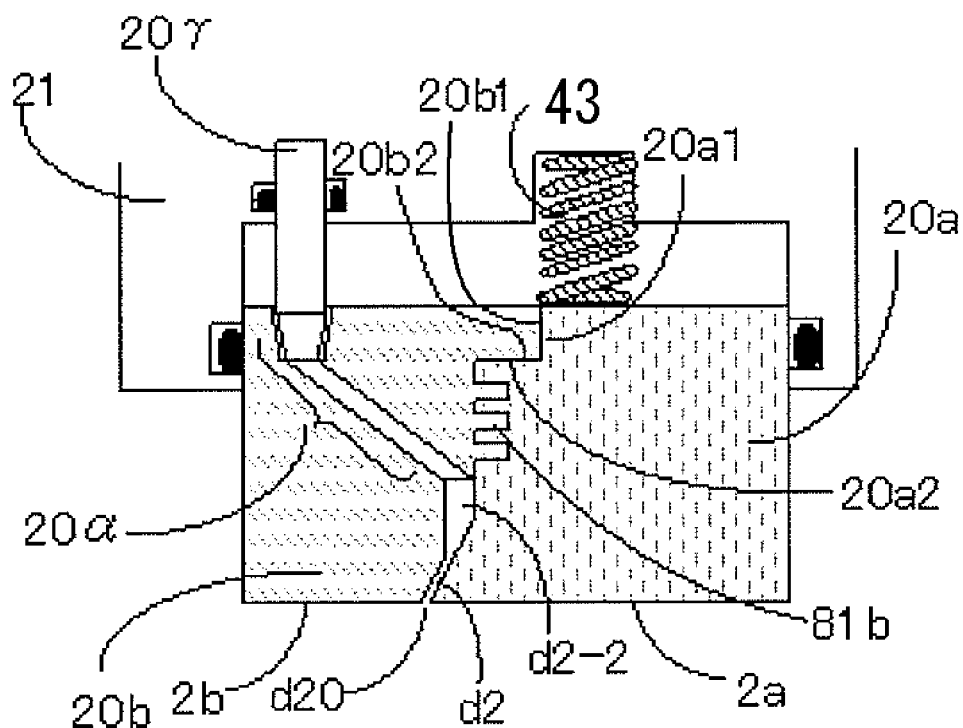
FIG. 7 is a sectional view of an important part of the second processing member and the second holder of the fluid processing apparatus according to still other embodiment of the present invention.

FIG. 7 shows a still further different embodiment. The second flow path d2 and d2-2 and the opening d20 are formed by assembling and integrating the first and second components 20a and 20b of the processing member. The second component 20b of the processing member is arranged with the nozzle 20α, which is connected to the second flow path d2-2. To this nozzle 20α may be connected second fluid introduction mechanism 20γ. Various tubes and the like may be used as the second fluid introduction mechanism 20γ; but, when this is arranged, it is desirable not to affect the floating structure mechanism of the processing member 20 in the present invention. The second fluid is introduced into the nozzle 20α from the second fluid introduction mechanism 20γ by a pneumatic transportation system and the like with a pump and an air by using the fluid pressure imparting mechanism p, and then into the flow path d2-2, the flow path d2, and then into between the processing surfaces 1 and 2 (2a and 2b) through the opening d20.

In the embodiment shown in FIG. 7, there is a merit in making a large diameter or clearance in the introducing process of the second fluid into between the processing surfaces 1 and (2a and 2b) except for the second introduction part d2 immediately before the opening d20, whereby reducing the pressure loss in sending the second fluid. The flow path d2-2 is not particularly restricted, but a form of a circular shape is preferable. As to the flow path d2 and the opening d20, by using the similar method to the composition method explained above, the flow path d2 and the opening d20 may be made a circular shape, or the single second flow path d2 and opening d20 may be employed. Depending on the purpose, they are variable.

According to the present invention, the processing member 20 comprising a plurality of the divided components 20a, 20b, and 20c of the processing member is provided. As a result, even in the case that the processing member 20 with a large disk diameter having a ring form is needed upon upscaling, entirety of the large processing member 20 is not necessarily formed all at once; and thus, a molding equipment or a sintering equipment with a large size is not necessary for it. In addition, by assembling a plurality of the divided components 20a, 20b, and 20c of the processing member, it became possible to provide the processing member 20 with the flow paths d2, d2-2, and d3 having the openings d20 and d30 that are leading to the space between the processing surfaces 1 and 2. Accordingly, the openings d20 and d30 and the flow paths d2, d2-2, and d3 do not require fine processing, which has been required in the past. In addition, because disassembly can be done, cleaning of the flow paths d2 and d3 having the openings d20 and d30, which has been difficult in the past, can be done easily.

EXPLANATION OF REFERENCE NUMERALS 1 first processing surface
2 second processing surface
10 first processing member
11 first holder
20 second processing member
21 second holder
23 separation-regulating surface
d1 first introduction part
d2 second introduction part
d3 third introduction part
d20 opening
d30 opening
p fluid pressure imparting mechanism
20a first component of processing member
20b second component of processing member
20c third component of processing member
2a processing surface of first component of processing member
2b processing surface of second component of processing member
2c processing surface of third component of processing member

The invention claimed is:

1. A fluid processing apparatus for processing a material to be processed, including at least two fluids to be processed, the fluid processing apparatus comprising:

two processing members configured to approach to and separate from each other, at least one of which rotates relative to the other, the two processing members each having a processing surface and being a disk having a ring form, the processing surfaces of the two processing members being facing each other, and the processing thereof is effected by introducing a first fluid to be processed into a space formed between the two processing surfaces; and a first flow path configured to introduce the first fluid to be processed into the space formed between the two processing surfaces, the first flow path is provided with an opening that leads to the space formed between the two processing surfaces and opens on one of the two processing surfaces, wherein at least one of the two processing members is comprised of a plurality of divided components including at least two members of a first member and a second member, and the at least one of the two processing members is formed by assembling the plurality of divided components, wherein each of the first and second member includes at least a portion thereof to form the processing surface of the at least one of the two processing members, and at least part of the first flow path and the opening are defined by a space formed between the first and second member after the first member and the second member are assembled.

2. The fluid processing apparatus according to claim 1, further comprising a second flow path configured to introduce a second fluid to be processed into the space formed between the two processing surfaces, wherein the second flow path being independent of the first flow path.

3. The fluid processing apparatus according to claim 1, wherein the plurality of divided components are made of different materials.

4. The fluid processing apparatus according to claim 1, wherein the processing surface of the at least one processing member formed by assembling the plurality of divided components is mirror-processed simultaneously under the state of the plurality of divided components being assembled.

5. The fluid processing apparatus according to claim 1, wherein the opening is in a circular ring form leading to the space between the processing surfaces and is formed by assembling the plurality of divided components of the at least one processing member.

6. The fluid processing apparatus according to claim 1, wherein the processing surface of the at least one processing member formed by assembling the plurality of divided components comprises different components that are not formed in the same plane.

7. The fluid processing apparatus according to claim 1, further comprising:

a fluid pressure imparting mechanism configured to impart a pressure to the second fluid to be processed;

a first holder configured to hold the first processing member and a second holder configured to hold the second processing member; and a rotation drive mechanism for rotating the first and second processing members relative to each other, wherein each of the processing surfaces constitutes part of the second flow path through which the second fluid to be processed is passed, of the first and second processing members, at least the second processing member is provided with a pressure-receiving surface, and at least part of the pressure-receiving surface is comprised of the second processing surface, the pressure-receiving surface receives pressure applied to the second fluid to be processed by the fluid pressure imparting mechanism thereby generating a force to move in a direction of separating the second processing surface from the first processing surface, and the second fluid to be processed under the pressure is passed between the first and second processing surfaces being capable of approaching to and separating from each other and rotating relative to each other, whereby the fluid to be processed forms a thin film fluid.

8. The fluid processing apparatus according to claim 2, wherein the plurality of divided components are made of different materials.

9. The fluid processing apparatus according to claim 2, wherein the processing surface of the at least one processing member formed by assembling the plurality of divided components is mirror-processed simultaneously under the state of the plurality of divided components being assembled.

10. The fluid processing apparatus according to claim 3, wherein the processing surface of the at least one processing member formed by assembling the plurality of divided components is mirror-processed simultaneously under the state of the plurality of divided components being assembled.

11. The fluid processing apparatus according to claim 2, wherein the opening is in a circular ring form leading to the space between the processing surfaces and is formed by assembling the plurality of divided components of the at least one processing member.

12. The fluid processing apparatus according to claim 3, wherein the opening is in a circular ring form leading to the space between the processing surfaces and is formed by assembling the plurality of divided components of the at least one processing member.

13. The fluid processing apparatus according to claim 4, wherein the opening is in a circular ring form leading to the space between the processing surfaces and is formed by assembling the plurality of divided components of the at least one processing member.

14. The fluid processing apparatus according to claim 2, wherein the processing surface of the at least one processing member formed by assembling the plurality of divided components comprises different components that are not formed in the same plane.

15. The fluid processing apparatus according to claim 3, wherein the processing surface of the at least one processing member formed by assembling the plurality of divided components comprises different components that are not formed in the same plane.

16. The fluid processing apparatus according to claim 4, wherein the processing surface of the at least one processing member formed by assembling the plurality of divided components comprises different components that are not formed in the same plane.

17. The fluid processing apparatus according to claim 5, wherein the processing surface of the at least one processing member formed by assembling the plurality of divided components comprises different components that are not formed in the same plane.

18. The fluid processing apparatus according to claim 2, further comprising:
a fluid pressure imparting mechanism configured to impart a pressure to the second fluid to be processed;
a first holder configured to hold the first processing member and a second holder configured to hold the second processing member; and
a rotation drive mechanism for rotating the first and second processing members relative to each other,
wherein each of the processing surfaces constitutes part of the second flow path through which the second fluid to be processed is passed, of the first and second processing members, at least the second processing member is provided with a pressure-receiving surface, and at least part of the pressure-receiving surface is comprised of the second processing surface, the pressure-receiving surface receives pressure applied to the second fluid to be processed by the fluid pressure imparting mechanism thereby generating a force to move in a direction of separating the second processing surface from the first processing surface, and the second fluid to be processed under the pressure is passed between the first and second processing surfaces being capable of approaching to and separating from each other and rotating relative to each other, whereby the fluid to be processed forms a thin film fluid.

19. The fluid processing apparatus according to claim 3, further comprising:
a fluid pressure imparting mechanism configured to impart a pressure to the second fluid to be processed;
a first holder configured to hold the first processing member and a second holder configured to hold the second processing member; and
a rotation drive mechanism for rotating the first and second processing members relative to each other,
wherein each of the processing surfaces constitutes part of the second flow path through which the second fluid to be processed is passed, of the first and second processing members, at least the second processing member is provided with a pressure-receiving surface, and at least part of the pressure-receiving surface is comprised of the second processing surface, the pressure-receiving surface receives pressure applied to the second fluid to be processed by the fluid pressure imparting mechanism thereby generating a force to move in a direction of separating the second processing surface from the first processing surface, and the second fluid to be processed under the pressure is passed between the first and second processing surfaces being capable of approaching to and separating from each other and rotating relative to each other, whereby the fluid to be processed forms a thin film fluid.

20. The fluid processing apparatus according to claim 4, further comprising:
a fluid pressure imparting mechanism configured to impart a pressure to the second fluid to be processed;
a first holder configured to hold the first processing member and a second holder configured to hold the second processing member; and
a rotation drive mechanism for rotating the first and second processing members relative to each other,
wherein each of the processing surfaces constitutes part of the second flow path through which the second fluid to be processed is passed, of the first and second processing members, at least the second processing member is provided with a pressure-receiving surface, and at least part of the pressure-receiving surface is comprised of the second processing surface, the pressure-receiving surface receives pressure applied to the second fluid to be processed by the fluid pressure imparting mechanism thereby generating a force to move in a direction of separating the second processing surface from the first processing surface, and the second fluid to be processed under the pressure is passed between the first and second processing surfaces being capable of approaching to and separating from each other and rotating relative to each other, whereby the fluid to be processed forms a thin film fluid.

21. The fluid processing apparatus according to claim 1, wherein the first member and the second member are provided with complementary shapes, and the first flow path comprising an entrance formed on one of the first and second members, an planar portion in a ring form defined by the first member and the second member, and an elongated portion defined by the first member and the second member and leading to the opening.

* * * * *